No. 782,692. PATENTED FEB. 14, 1905.
P. PETRI.
DEVICE FOR TRANSMITTING POWER IN SEWING OR OTHER MACHINES.
APPLICATION FILED JULY 20, 1904.

Witnesses
C. M. Catlin
J. W. Tallmadge

Inventor
Philip Petri

No. 782,692. Patented February 14, 1905.

UNITED STATES PATENT OFFICE.

PHILIP PETRI, OF ZANESVILLE, OHIO.

DEVICE FOR TRANSMITTING POWER IN SEWING OR OTHER MACHINES.

SPECIFICATION forming part of Letters Patent No. 782,692, dated February 14, 1905.

Application filed July 20, 1904. Serial No. 217,433.

*To all whom it may concern:*

Be it known that I, PHILIP PETRI, a citizen of the United States, residing at Zanesville, in the county of Muskingum and State of Ohio, have invented new and useful Improvements in Devices for Transmitting Power in Sewing or other Machines, of which the following is a specification.

This invention relates to means intermediate the driven and the driving gear-wheels of a sewing-machine or the like for driving a wheel always in the same direction whatever be the direction of the driving-gear. Its object is to avoid the necessity of special care in starting the mechanism, as by a treadle, for example, to avoid a reverse movement or one that will break the thread or otherwise interfere with the best and speediest action of the mechanism.

The invention consists in the construction hereinafter described, and pointed out in the claims.

Figure 1:
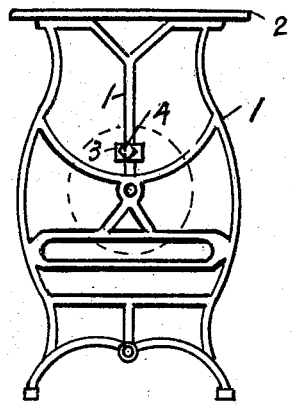
Figure 3:
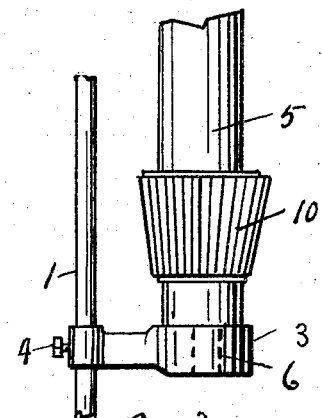
Figure 2:
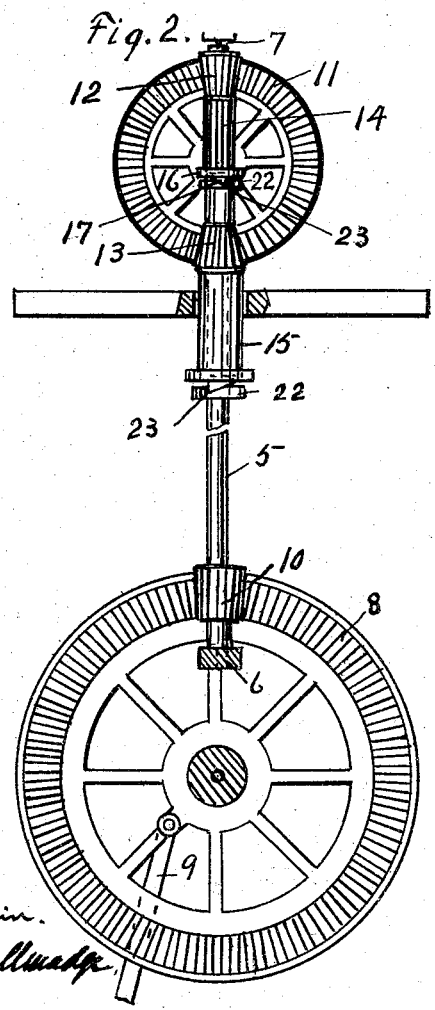
Figure 4:
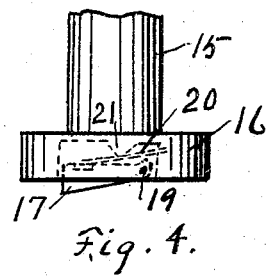
Figure 5:
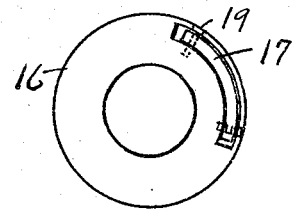

In the accompanying drawings, forming part of this specification, Figure 1 indicates an end elevation of a sewing-machine frame. Fig. 2 is an elevation of mechanism for transmitting power. Fig. 3 is a partial elevation showing a bearing-support of a driving-shaft. Fig. 4 is an elevation, partly broken away, of a spring-pressed driving-pawl; and Fig. 5 is a bottom view of the said pawl.

Numeral 1 denotes an upright member of a machine-frame, and 2 its table. 3 denotes a bracket secured to said member in any convenient manner, as by a set-screw 4. 5 denotes a shaft having a bearing at 6 in said bracket. 7 denotes a pivot support or bearing at the opposite end of the shaft.

8 denotes a bevel gear-wheel, and 9 a connecting-rod, whereby said wheel may be driven, as by a treadle. Said wheel is operatively connected to drive a pinion 10, fixed on shaft 5.

11 denotes a bevel-gear to be driven, which is suitably supported and operatively connected to the needle-bar of a sewing-machine or the like in any usual or convenient manner.

12 and 13 denote pinions fixed, respectively, on sleeves 14 and 15 and adapted to be each driven in one direction only and that opposite to the direction of the other. These pinions mesh with the gear 11 on diametrically opposite sides, whereby said gear will be driven in the same direction whichever pinion is driving it.

The sleeves carrying the pinions have collars 16, provided with retreating spring-held pawls 17, situated in recesses in sleeve-collars 18 and pivoted at 19, the springs being denoted by 20.

In the present instance straight springs are indicated, and 21 denotes an elevation in the bottom of each recess, over which a spring is bent to put it under tension when the pawl is depressed in said recess by contact with the horizontal surface of a collar 22, fixed on shaft 5. Said collar has a shoulder or projection 23, arranged to be operately engaged by the pawl when the shaft is driven in suitable direction, the same pawl being inoperative when the shaft is oppositely driven. Each sleeve is provided with a similar pawl, coacting in like manner with a shoulder 23, except that it is actuated by a movement of the shaft opposite to that which actuates the other.

The devices being constructed and arranged as described it is obvious that the gear 11 will always be driven in the same direction and that in a sewing or other machine the inconvenience and damage caused by reverse movement is avoided.

Heretofore gears have been combined in such manner that one is always driven in a required direction whatever be the direction of the rotation of the driving-gear, and such construction is not broadly claimed herein.

My improvement comprises a shaft mounted in manner set forth, whereby it is conveniently connected to a machine and pinion-carrying sleeves to insure accurate meshing of the pinions with the driven gear, and such sleeves and special devices for suitably journaling the shaft and connecting it with a driven gear.

I am aware that an axle or shaft has been provided with a spur-gear to mesh with a like gear fixed on a counter-shaft carrying sleeves each having a bevel-gear which is made operative by a sliding clutch actuated by a suitable face on the sleeve, the driving-shaft gear being alternately in mesh with a bevel-gear according to the direction of rotation of the device, and I do not broadly claim mechanism of this character for preventing reversal of a driven shaft. My improvement is characterized by greater simplicity, the use of sliding clutches being obviated and the driving-gear always in mesh with a single pinion and the driven gear in mesh with two pinions, and it is further characterized by certain details of construction hereinafter pointed out.

Having thus described the invention, what I claim is—

1. The combination of a gear-wheel, means for driving it in either of two directions, a second gear-wheel, and intermediate mechanism for transmitting power from the first to the second wheel, said mechanism comprising a shaft 5 rotatable in opposite directions as driven by the first-named wheel, sleeves rotatably mounted on said driven shaft, pinions fixed one to each sleeve and constantly engaged with the said second gear on opposite sides thereof, and means whereby upon rotation of the shaft in either direction one of said pinions is operatively connected to the shaft said second gear-wheel being always rotated in the same direction.

2. The combination of a gear-wheel, rotatable in opposite directions, means for driving it, a second wheel, and intermediate mechanism for transmitting power from the first to the second wheel, said mechanism comprising a shaft rotatable in opposite directions as driven by the first-named wheel, sleeves rotatably mounted upon said shaft, pinions fixed one to each sleeve and constantly engaged with said second gear on opposite sides thereof, and means whereby upon rotation of the shaft in either direction a pinion is operatively connected to said gear to rotate it always in the same direction, said means comprising spring-pawls on the sleeves and shoulders on the shaft.

3. Mechanism for driving a gear-wheel comprising a shaft rotatable in opposite directions, sleeves mounted to rotate on the shaft, pinions fixed on the sleeves and constantly meshing with said wheel on opposite sides thereof, spring-pawls on the sleeves, one on each, and shoulders on the shaft, whereby opposite rotation of the shaft drives the wheel always in the same direction, said sleeves being provided with recessed collars to receive the pawls and springs, and said shaft provided with two shoulders each being opposite to the other to engage the pawls alternately.

4. Mechanism for driving a gear-wheel comprising a shaft rotatable in opposite directions, sleeves mounted to rotate on the shaft, pinions fixed on the sleeves and constantly meshing with said wheel on opposite sides thereof, spring-pawls on the sleeves, one on each, and shoulders on the shaft, whereby opposite rotation of the shaft drives the wheel always in the same direction said shaft having a bearing 6 at one end and a pivot-bearing at the other.

5. The combination of the frame member 1, the bracket, the shaft journaled in said bracket, the pivot-bearing for the shaft at its opposite end, means for oppositely rotating the shaft, a gear driven by said shaft, and intermediate connections whereby the rotation of the shaft in either direction rotates said gear always in the same direction.

6. The combination of the frame 1, the bracket, the shaft journaled in said bracket, the pivot-bearing for the shaft at its opposite end, means for oppositely rotating the shaft, a gear driven by said shaft, and intermediate connections whereby the rotation of the shaft in either direction rotates said gear always in the same direction comprising the sleeves, the pinions, the spring-pawls on the sleeves and the shoulders on the shaft.

In testimony whereof I have hereunto set my hand in presence of two subscribing witnesses.

PHILIP PETRI.

Witnesses:
F. M. GRAHAM,
EDWD. R. MEYR.